US008429995B2

(12) United States Patent
Yamashita et al.

(10) Patent No.: US 8,429,995 B2
(45) Date of Patent: Apr. 30, 2013

(54) OUTPUT POWER TRANSMISSION DEVICE AND MOTOR WITH SPEED REDUCING MECHANISM

(75) Inventors: Tomoki Yamashita, Hamamatsu (JP); Hiroaki Yamamoto, Toyohashi (JP); Hidenori Ishihara, Hamamatsu (JP); Hiroshi Kokubu, Kosai (JP); Nakatsune Shirai, Iwata (JP); Katsumi Endo, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 910 days.

(21) Appl. No.: 12/458,048

(22) Filed: Jun. 30, 2009

(65) Prior Publication Data
US 2010/0000355 A1 Jan. 7, 2010

(30) Foreign Application Priority Data

Jul. 7, 2008 (JP) ................................ 2008-176956
Jul. 22, 2008 (JP) ................................ 2008-188819

(51) Int. Cl.
*F16H 55/18* (2006.01)
(52) U.S. Cl.
USPC .......................................................... 74/409
(58) Field of Classification Search ............. 74/409, 74/411, 440, 425
See application file for complete search history.

(56) References Cited

U.S. PATENT DOCUMENTS

| 3,122,938 | A | * | 3/1964 | Visser ............................. 74/409 |
| 3,127,784 | A | * | 4/1964 | O'Neill ........................... 74/440 |
| 3,635,100 | A | * | 1/1972 | Littmann ......................... 74/411 |
| 4,428,250 | A | * | 1/1984 | Becker et al. .................... 74/425 |
| 4,643,040 | A | * | 2/1987 | Adam et al. ..................... 74/425 |
| 4,742,726 | A | * | 5/1988 | Adam et al. ..................... 74/425 |
| 4,748,865 | A | * | 6/1988 | Umezawa et al. ............... 74/411 |
| 4,770,055 | A | * | 9/1988 | Chevance et al. ............... 74/411 |
| 4,770,056 | A | * | 9/1988 | Becker et al. ................... 74/505 |
| 4,821,589 | A | * | 4/1989 | Fukumoto et al. ........... 74/89.22 |
| 4,885,948 | A | * | 12/1989 | Thrasher et al. ............. 74/89.14 |
| 4,899,608 | A | * | 2/1990 | Knappe et al. .................. 74/411 |
| 5,178,026 | A | * | 1/1993 | Matsumoto ..................... 74/411 |
| 5,216,929 | A | * | 6/1993 | Ochiai et al. .................... 74/425 |
| 6,169,346 | B1 | * | 1/2001 | Nakamura et al. .......... 310/75 D |
| 6,463,829 | B2 | * | 10/2002 | Torii et al. .................. 74/606 R |
| 6,481,306 | B2 | * | 11/2002 | Adachi et al. ................... 74/425 |

(Continued)

FOREIGN PATENT DOCUMENTS

JP JP-U-H6-69493 9/1994
JP JP-A-2001-343052 12/2001

*Primary Examiner* — Ha D Ho
*Assistant Examiner* — Jude Agendia
(74) *Attorney, Agent, or Firm* — Posz Law Group, PLC

(57) ABSTRACT

An output power transmission device has a transmission plate and a C-ring. The transmission plate is attached to a wheel gear in an axial direction of the wheel gear such that the transmission plate directly engages with the wheel gear in a rotation direction. The transmission plate functions as a transmission member for transmitting rotation of the wheel gear to an output shaft. The C-ring is provided at a position where the C-ring sandwiches the transmission plate with the wheel gear in the axial direction. The C-ring functions as a restriction section for restricting movement of the transmission plate in the axial direction opposite from the wheel gear side. An elastic claw section as a pressing member is formed on the wheel gear. The elastic claw section presses the transmission plate against the C-ring in the axial direction.

19 Claims, 10 Drawing Sheets

U.S. PATENT DOCUMENTS

| | | | |
|---|---|---|---|
| 6,591,707 B2 * | 7/2003 | Torii et al. | 74/425 |
| 7,322,257 B2 * | 1/2008 | Becker et al. | 74/409 |
| 2004/0060379 A1 * | 4/2004 | Bernhard et al. | 74/388 PS |
| 2005/0235768 A1 * | 10/2005 | Shimizu et al. | 74/425 |

* cited by examiner

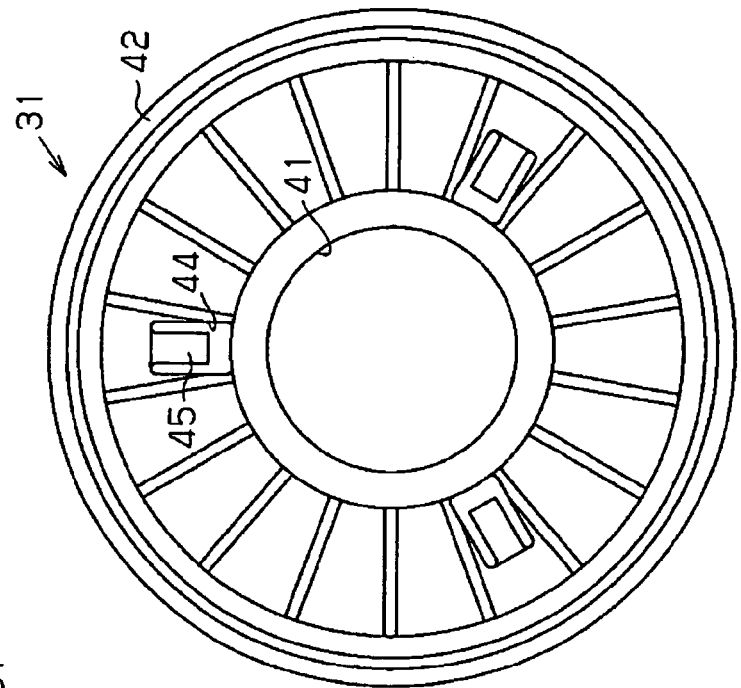
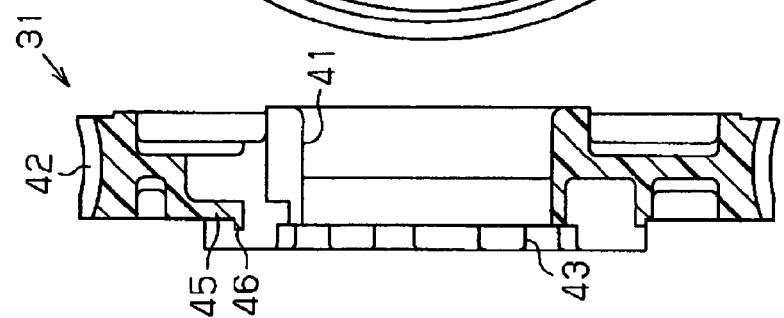
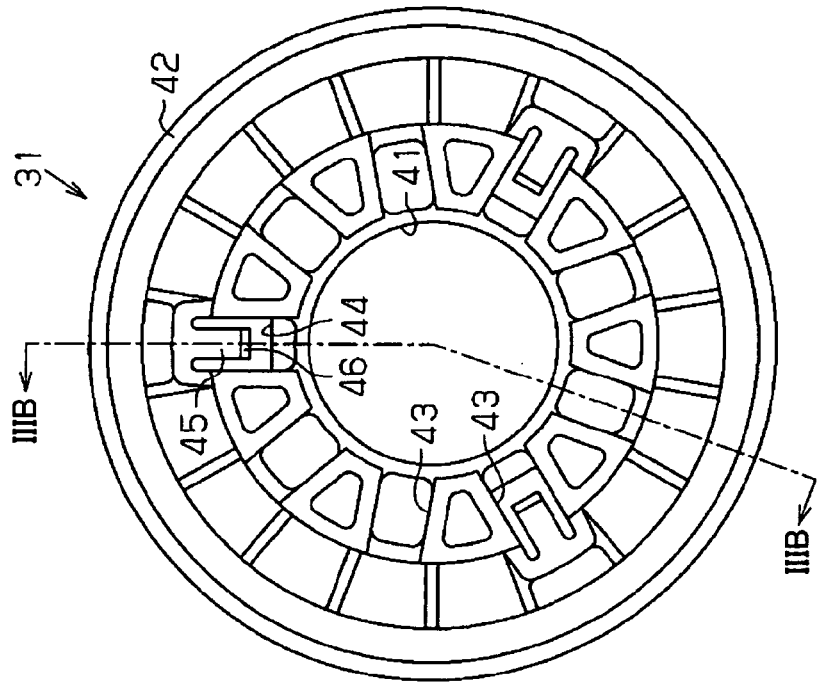

FIG. 6A
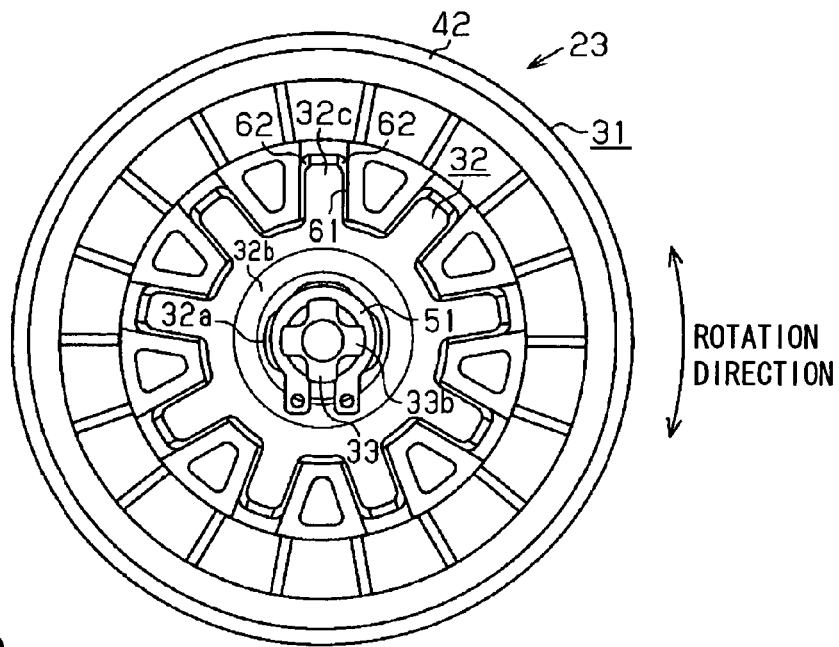
FIG. 6B
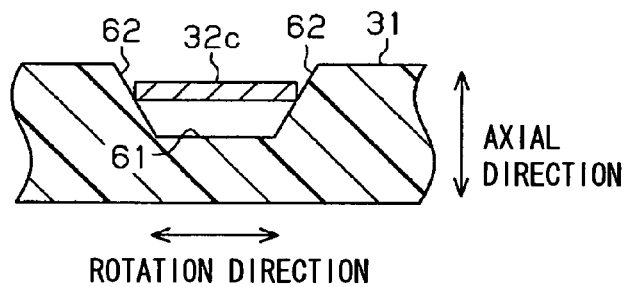
FIG. 7A
FIG. 7B
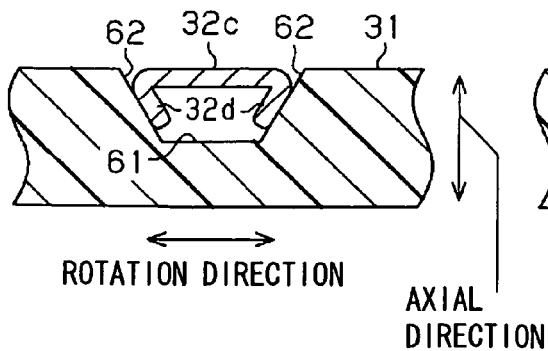
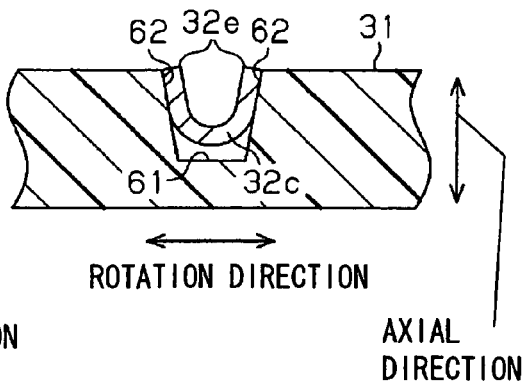

OUTPUT POWER TRANSMISSION DEVICE AND MOTOR WITH SPEED REDUCING MECHANISM

CROSS REFERENCE TO RELATED APPLICATIONS

This application is based on and incorporates herein by reference Japanese Patent Applications No. 2008-176956 filed on Jul. 7, 2008 and No. 2008-188819 filed on Jul. 22, 2008.

BACKGROUND OF THE INVENTION

1. Field of the Invention

The present invention relates to an output power transmission device and to a motor with a speed reducing mechanism.

2. Description of Related Art

Conventionally, for example, a power window motor for opening and closing window glass of an automobile is constructed of a motor with a speed reducing mechanism, in which an output power transmission device (a speed reducing section) and a motor main body are integrated. The output power transmission device is constructed by meshing a worm shaft, which rotates due to drive of the motor main body, and a wheel gear (for example, refer to Patent document 1: Japanese Utility Model No. H6-69493). The output power transmission device has the worm shaft, the wheel gear meshed with the worm shaft, a transmission member and an output shaft (an intermediate wheel and a pinion in Patent document 1), the transmission member and the output shaft rotating integrally with the wheel gear. A damper as a buffer member is provided between the wheel gear and the output shaft. The damper contacts with the wheel gear and the output shaft in the axial direction and the rotation direction of the wheel gear, respectively. The damper functions to absorb a shock at the time when the worm shaft transmits the rotation to the output shaft. Thus, breakage of component parts of the output power transmission device such as the worm shaft is inhibited.

In such the output power transmission device, improvement of strength of the worm shaft and the like enables a structure that does not need the damper, thereby contributing to inhibition of increase of the number of the parts. However, if the damper is eliminated, it is anticipated that backlash arises between the wheel gear and the output shaft in the axial direction of the wheel gear due to a dimension error, an assembly error and the like. Thus, there is a room for improvement in this point.

Another example of power window motor for opening and closing window glass of an automobile (described in Patent document 2: JP-A-2001-343052) is constructed of a motor with a speed reducing mechanism, in which an output power transmission device (a speed reducing section) is integrated with a motor main body. The output power transmission device is constructed by meshing a worm shaft, which rotates due to drive of the motor main body, with a wheel gear. The output power transmission device is structured such that the rotation of the worm shaft is transmitted to an output shaft through the wheel gear and a metallic transmission member (a driving force output plate in Patent document 2) rotating integrally the wheel gear. The transmission member is attached to an axial end face of the wheel gear and functions to improve strength of the gear. A damper as a buffer member is provided between the wheel gear and the transmission member. The damper is interposed between the wheel gear and the transmission member in a direction of the rotation of the wheel gear and functions to absorb a shock at the time when the worm shaft transmits the rotation to the output shaft. Thus, breakage of component parts of the output power transmission device such as the worm shaft is inhibited.

However, in the above-described output power transmission device, the damper as the buffer member is provided as a separate member. Therefore, the number of the parts is large, and there is a room for improvement in this point.

SUMMARY OF THE INVENTION

It is an object of the present invention to provide an output power transmission device capable of inhibiting backlash between a wheel gear and an output shaft in an axial direction even if a buffer member is not used.

It is another object of the present invention to provide an output power transmission device and a motor with a speed reducing mechanism capable of alleviating an impact force between a wheel gear and a transmission member even if a buffer member is not used.

According to an aspect of the present invention, an output power transmission device transmits rotation of a rotary shaft having a worm section on an outer periphery thereof to an output shaft through a wheel gear meshing with the worm section. The output power transmission device has a transmission member, a restriction section and a pressing member.

The transmission member is attached to the wheel gear in an axial direction of the wheel gear such that the transmission member directly engages with the wheel gear in a rotation direction for transmitting rotation of the wheel gear to the output shaft.

The restriction section is provided at a position where the restriction section sandwiches the transmission member with the wheel gear in the axial direction for restricting movement of the transmission member in a direction opposite from the wheel gear side.

The pressing member presses the transmission member against either one of the wheel gear and the restriction section in the axial direction.

According to the above aspect of the present invention, the pressing member presses the transmission member against either one of the wheel gear and the restriction section in the axial direction. Accordingly, a dimension error, an assembly error and the like between the wheel gear and the transmission member in the axial direction are absorbed. Therefore, backlash between the wheel gear and the transmission member in the axial direction can be inhibited even if a buffer member is not used. Eventually, backlash between the wheel gear and the output shaft in the axial direction can be inhibited.

According to another aspect of the present invention, in the above output power transmission device, one of the wheel gear and the transmission member is provided with a rotation direction pressing section that elastically contacts the other one of the wheel gear and the transmission member in the rotation direction.

According to the above aspect of the present invention, the dimension error, the assembly error and the like between the wheel gear and the transmission plate in the rotation direction are absorbed by the rotation direction pressing section. Thus, the backlash between the wheel gear and the transmission plate in the rotation direction can be inhibited.

According to another aspect of the present invention, in the above output power transmission device, the pressing member is an elastic claw section that is formed in one of the wheel gear and the transmission member and that presses the other one of the wheel gear and the transmission member in the axial direction. The transmission member is structured to be pressed against the restriction section in the axial direction by an elastic force of the elastic claw section.

According to the above aspect of the present invention, the transmission member can be pressed against the restriction section in the axial direction with the elastic claw section as the pressing member.

According to another aspect of the present invention, in the above output power transmission device, the restriction section constitutes the pressing member and is provided in a state where the restriction section presses the transmission member against the wheel gear in the axial direction.

According to the above aspect of the present invention, the restriction section doubles as the pressing member. Therefore, specific structure as a pressing member is unnecessary, so the structure can be simplified.

According to another aspect of the present invention, in the above output power transmission device, the wheel gear is formed with an inclined section inclined toward the rotation direction of the wheel gear. The transmission member is structured such that the transmission member is pressed against the inclined section of the wheel gear in the axial direction by the restriction section.

According to the above aspect of the present invention, thrust of the restriction section in the axial direction is distributed also in the rotation direction. Accordingly, the transmission member is pressed against the wheel gear in the rotation direction. Therefore, the backlash not only in the axial direction but also in the rotation direction can be inhibited by the simple structure.

According to another aspect of the present invention, a motor with a speed reducing mechanism has a motor main body having a rotary shaft and is structured to be able to output rotation of the rotary shaft of the motor main body through the above output power transmission device.

According to the above aspect of the present invention, the motor with the speed reducing mechanism capable of inhibiting the backlash between the wheel gear and the output shaft in the axial direction can be provided.

Thus, according to the above aspects of the invention, the backlash between the wheel gear and the output shaft in the axial direction can be inhibited even if the buffer member is not used.

According to another aspect of the present invention, in the above output power transmission device, the transmission member has a base section attached to the output shaft and at least one engagement piece formed such that the engagement piece protrudes from the base section in a radial direction and such that at least a part of the engagement piece can deform in an axial direction of the output shaft. The transmission member is attached to the wheel gear through the engagement piece such that the transmission member and the wheel gear can rotate integrally.

According to another aspect of the present invention, in the above output power transmission device, the wheel gear is formed with an inclined section that engages with the engagement piece of the transmission member in the rotation direction and that guides the deformation of at least a part of the engagement piece in the axial direction. The deformation of the engagement piece allows relative rotation between the wheel gear and the transmission member.

According to the above aspects of the present invention, for example, when a load is suddenly applied to the output shaft and the rotation of the output shaft stops in a state where the rotation of the rotary shaft is transmitted to the output shaft through the wheel gear and the transmission member and the output shaft is rotating, the engagement piece of the transmission member is guided by the inclined section of the wheel gear and deforms in the axial direction. The deformation allows the relative rotation between the wheel gear and the transmission member. Thus, the relative rotating force (torque) of the wheel gear with respect to the transmission member is distributed in the axial direction. That is, the transmission member functions to absorb a shock generated between the transmission member and the wheel gear. Therefore, the impact force between the wheel gear and the transmission member can be alleviated even if the buffer member is not used.

According to another aspect of the present invention, in the above output power transmission device, the engagement piece of the transmission member is structured such that the engagement piece can elastically deform in the axial direction with respect to the base section due to the guide by the inclined section of the wheel gear.

According to another aspect of the present invention, in the above output power transmission device, the engagement piece of the transmission member is structured such that an end portion of the engagement piece in the rotation direction can elastically deform in the axial direction due to the guide by the inclined section of the wheel gear.

According to the immediately above two aspects of the present invention, at least the part of the engagement piece can be elastically deformed in the axial direction because of the guide by the inclined section of the wheel gear. Therefore, the shock generated between the transmission member and the wheel gear in the rotation direction can be suitably distributed in the axial direction by the elastic force of the engagement piece.

According to another aspect of the present invention, in the above output power transmission device, the restriction section is provided to the output shaft as a fixing member for restricting movement of the base section of the transmission member in the axial direction of the output shaft.

According to the above aspect of the present invention, the axial movement of the base section of the transmission member is restricted by the fixing member. Therefore, at least a part of the engagement piece of the transmission member can be deformed elastically in the axial direction with respect to the base section with the use of the relative rotation between the wheel gear and the transmission member. Moreover, backlash of the transmission member in the axial direction can be inhibited by the fixing member.

According to yet another aspect of the present invention, a motor with a speed reducing mechanism has a motor main body having a rotary shaft and is structured to be able to output rotation of the rotary shaft of the motor main body through the above output power transmission device.

According to the above aspect of the present invention, the motor with the speed reducing mechanism capable of alleviating an impact force between the wheel gear and the transmission member can be provided.

Therefore, according to the above aspects of the present invention, the impact force between the wheel gear and the transmission member can be alleviated even if the buffer member is not used.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 3A is a front view showing a wheel gear according to the FIG. 1 embodiment;

FIG. 3B is a cross-sectional view showing the wheel gear of FIG. 3A taken along the line IIIB-IIIB;

FIG. 3C is a rear view showing the wheel gear according to the FIG. 1 embodiment;

FIG. 6A is a front view showing an output member according to a modified embodiment of the present invention;

FIG. 6B is a cross-sectional view showing the output member according to the FIG. 6A embodiment;

FIGS. 7A and 7B are cross-sectional views showing elastic sections according to another modified embodiments of the present invention;

DETAILED DESCRIPTION OF EXAMPLE EMBODIMENTS

Figure 1:
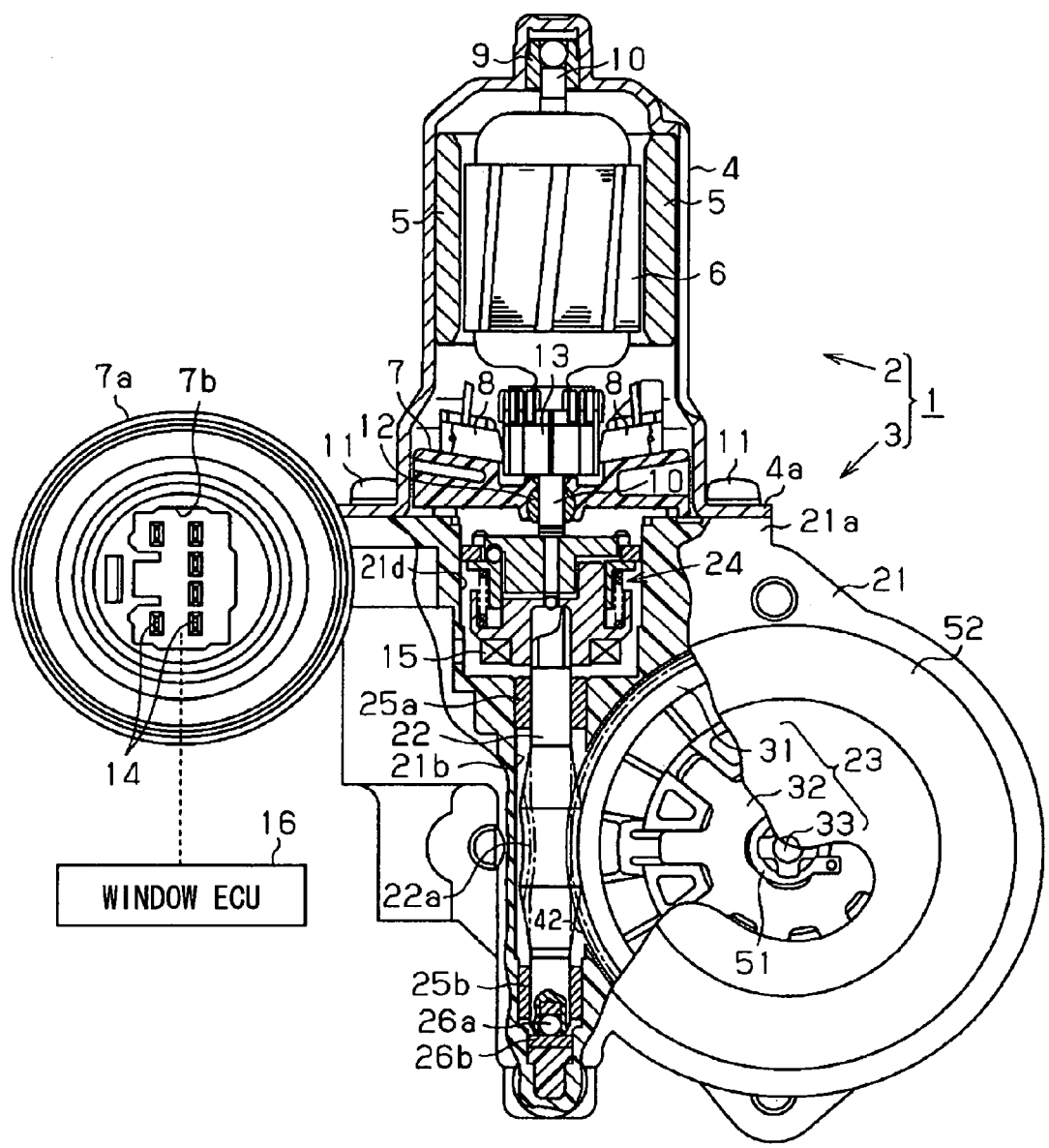
FIG. 1 is a cross-sectional view showing a motor according to an embodiment of the present invention.

Hereafter, embodiments of the present invention will be described with reference to the drawings. A motor 1 according to an embodiment of the present invention shown in FIG. 1 is a power window motor for opening and closing window glass of an automobile. The motor 1 is constituted by a motor with a speed reducing mechanism consisting of a motor main body 2 and a speed reducing section 3 as an output power transmission device.

The motor main body 2 has a yoke housing 4, a pair of magnets 5, an armature 6, a brush holder 7 and a pair of brushes 8. The yoke housing 4 is formed substantially in the shape of a flat cylinder having a bottom. The magnets 5 are fixed to an inner face of the yoke housing 4. A bushing 9 is provided in a central portion of the bottom of the yoke housing 4 and rotatably supports a base end of a rotary shaft 10 of the armature 6.

An opening section 4a of the yoke housing 4 is formed in the shape of a flange and is fixed to an opening section 21a of a gear housing 21 (mentioned in detail later) with screws 11. Due to the fixation, the brush holder 7 is sandwiched and fixed by the opening section 4a of the yoke housing 4 and the opening section 21a of the gear housing 21.

In the yoke housing 4, the brush holder 7 holds a bushing 12, which rotatably supports a tip of the rotary shaft 10 of the armature 6, and the brushes 8, which slidably contact with a commutator 13 fixed to the rotary shaft 10. A portion of the brush holder 7 protruding from the housings 4, 21 is a connector section 7a to be connected with a vehicle body side connector (not shown) extending from a vehicle body side. Multiple terminals 14 are exposed in a recess section 7b of the connector section 7a. The terminals 14 are inserted in the brush holder 7 and are electrically connected with the brushes 8, a rotation sensor 15 provided in the motor 1 and the like. Due to the connection between the connector section 7a and the vehicle body side connector, the motor 1 is electrically connected with a window ECU 16 provided on the vehicle body side and power supply, output of sensor signals and the like are performed.

While the motor main body 2 is structured as described above, the speed reducing section 3 has the gear housing 21, a worm shaft 22 (a rotary shaft), an output member 23 and a brake mechanism 24. The output member 23 outputs rotation of the worm shaft 22 to an exterior. The output member 23 consists of a wheel gear 31, a transmission plate 32 as a transmission member and an output shaft 33 (refer to FIGS. 2A and 2B).

The gear housing 21 is made of a resin. The worm shaft 22, the wheel gear 31, the transmission plate 32 and the brake mechanism 24 are accommodated inside the gear housing 21. The gear housing 21 has the opening section 21a facing the opening section 4a of the yoke housing 4. The brush holder 7 is interposed between the opening sections 4a, 21a.

The gear housing 21 has a shaft accommodation tube section 21b, a wheel accommodation recess section 21c and a brake accommodation recess section 21d. The shaft accommodation tube section 21b is formed substantially in the shape of a cylinder extending from the opening section 21a in an axial direction of the worm shaft 22 and accommodates the worm shaft 22. The wheel accommodation recess section 21c communicates with the shaft accommodation tube section 21b and accommodates the wheel gear 31. The brake accommodation recess section 21d is provided at a base end of the shaft accommodation tube section 21b (on the motor main body 2 side) and accommodates the brake mechanism 24.

The shaft accommodation tube section 21b accommodates the worm shaft 22 such that the worm shaft 22 is rotatably supported by a pair of bushings 25a, 25b, which are spaced at a predetermined interval, coaxially with the rotary shaft 10. A worm 22a (a worm section) to be meshed with the wheel gear 31 is formed on the worm shaft 22 between the positions where the worm shaft 22 is supported by the bushings 25a, 25b. The diameter of the worm 22a is smaller in the central portion thereof than in the both end portions thereof with respect to the axial direction. Thus, the worm 22a is constituted by a double enveloping worm extending along an outer peripheral portion of the wheel gear 31. That is, the worm 22a and the wheel gear 31 mesh with each other over a wide range, and a large meshing number between the worm 22a and the wheel gear 31 can be obtained (i.e., the worm 22a and the wheel gear 31 can mesh with each other at a large number of points). Thus, strength at the meshed portions is improved. Thus, breakage of the worm shaft 22 and the wheel gear 31 and the like can be inhibited even if a buffer member such as rubber is not provided between the wheel gear 31 and the transmission plate 32 in the rotation direction. A thrust receiving ball 26a and a thrust receiving plate 26b for receiving a thrust load of the worm shaft 22 are provided at the tip of the worm shaft 22.

The brake accommodation recess section 21d accommodates the brake mechanism 24 interposed between the rotary shaft 10 of the motor main body 2 and the worm shaft 22. The brake mechanism 24 transmits a rotational force (i.e., torque) of the rotary shaft 10 to the worm shaft 22 when the rotary shaft 10 rotates due to the drive of the motor main body 2. If a rotational force (i.e., torque) from the output member 23 side is inputted to the brake mechanism 24 through the worm shaft 22, the brake mechanism 24 operates to cause a braking force to restrict the rotation of the brake mechanism 24.

Figure 2B:
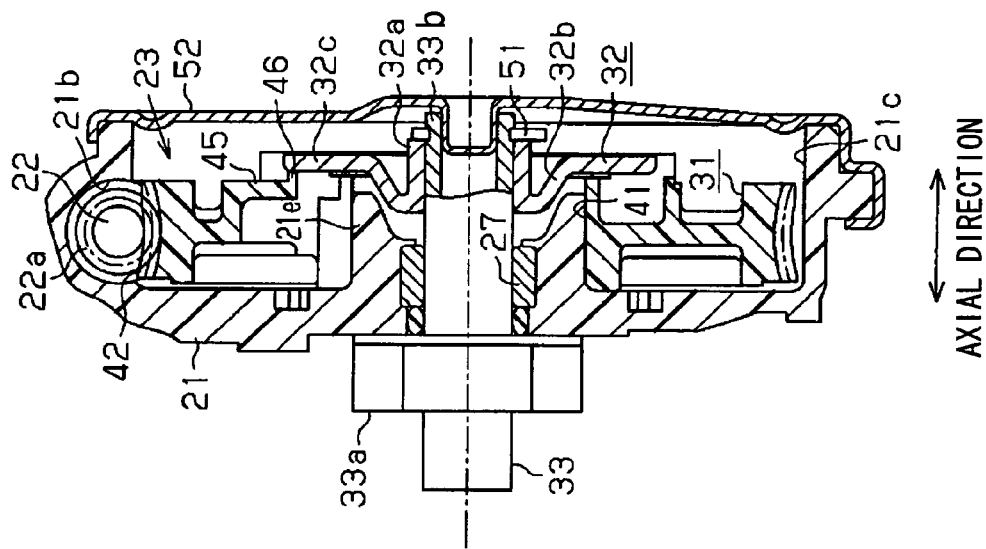
FIG. 2B is a cross-sectional view showing a speed reducing section according to the FIG. 1 embodiment.
Figure 2A:
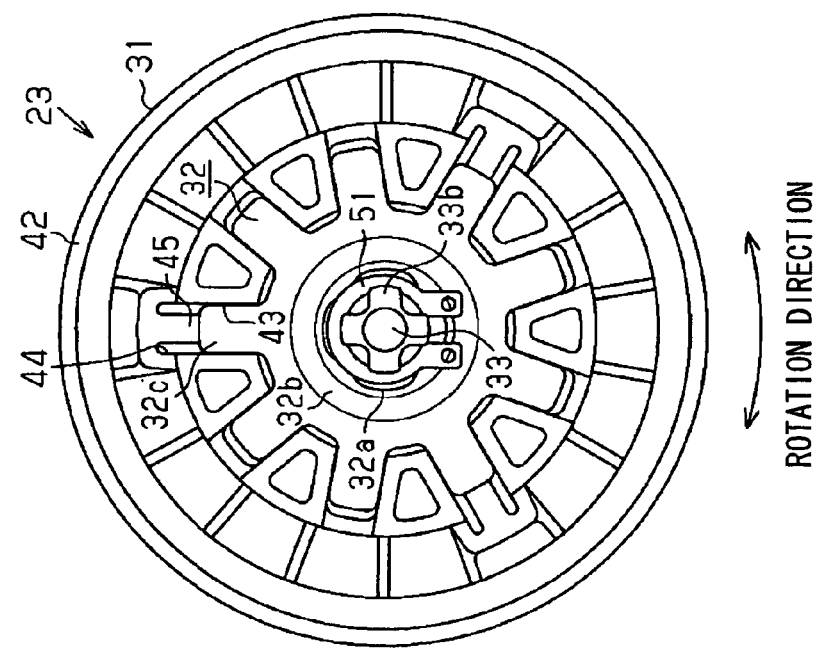
FIG. 2A is a front view showing an output member according to the FIG. 1 embodiment.

As shown in FIG. 2B, a cylindrical support section 21e extending in the axial direction of the wheel gear 31 (i.e., in a horizontal direction in FIG. 2B) is formed in a central portion of the wheel accommodation recess section 21c. The cylindrical support section 21e is inserted into an insertion hole 41 of the wheel gear 31 and rotatably supports the wheel gear 31. A bushing 27 is provided to the cylindrical support section 21e and rotatably supports the output shaft 33.

The wheel gear 31 is made of a resin. As shown in FIGS. 3A to 3C, a gear section 42 to be meshed with the worm 22a of the worm shaft 22 is formed on the outer peripheral portion of the wheel gear 31, and the insertion hole 41 is formed in the central portion of the wheel gear 31. On an axial end face of the wheel gear 31 shown in FIG. 2A, nine engagement grooves 43 extending in radial directions are formed between the insertion hole 41 and the gear section 42 at equal circumferential intervals. Each engagement groove 43 extends in the radial direction. Both side surfaces of each engagement groove 43 facing in the circumferential direction are parallel to each other. Through holes 44 penetrating through the wheel gear 31 in the axial direction are formed in certain three engagement grooves 43 out of the nine engagement grooves 43, the certain three engagement grooves 43 being positioned at equal circumferential intervals. Each through hole 44 is formed with an elastic claw section 45 as a pressing member extending radially inward from an outer peripheral end portion of the through hole 44. Deflection of the elastic claw section 45 in the axial direction is allowed. A protruding section 46 protruding in the axial direction of the wheel gear 31 is formed at an inner peripheral end portion of each elastic claw section 45.

As shown in FIG. 2B, the tip of the output shaft 33 rotatably supported by the bushing 27 protrudes to the outside of the gear housing 21. A connection section 33a connected with a window regulator (not shown) for driving the same is formed near the tip of the output shaft 33. The window regulator opens and closes the window glass. The connection section 33a is in contact with an outer surface of the gear housing 21 (or the wheel accommodation recess section 21c) in the axial direction. A base end section of the output shaft 33 is located in the gear housing 21 (or the wheel accommodation recess section 21c). The base end section is formed with a plate attachment section 33b, to which the transmission plate 32 is attached. The transmission plate 32 constitutes the output member 23 together with the output shaft 33 and the wheel gear 31. The plate attachment section 33b is formed in a cross shape when viewed in the axial direction (refer to FIG. 2A).

Figure 4A:
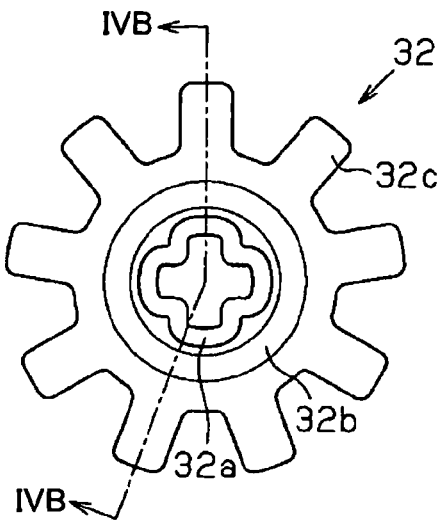
FIG. 4A is a front view showing a transmission plate according to the FIG. 1 embodiment.
Figure 4B:
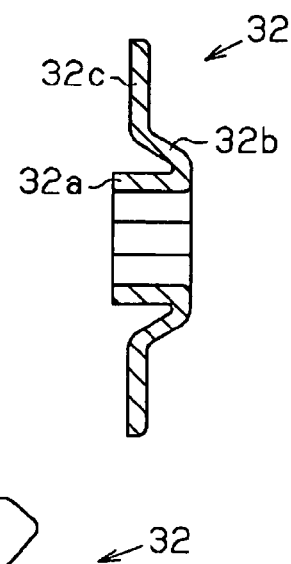
FIG. 4B is a cross-sectional view showing the transmission plate of FIG. 4A taken along the line IVB-IVB.
Figure 4C:
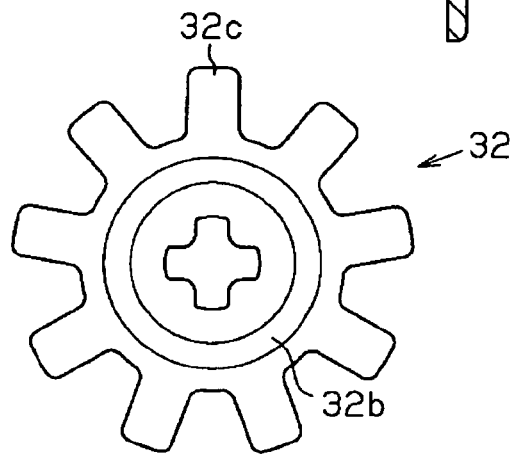
FIG. 4C is a rear view showing the transmission plate according to the FIG. 1 embodiment.

The transmission plate 32 is made of a metal. As shown in FIGS. 4A to 4C, a tubular section 32a is formed in the central portion of the transmission plate 32. The plate attachment section 33b of the output shaft 33 is inserted into the tubular section 32a. The tubular section 32a is formed in a cross shape corresponding to the shape of the plate attachment section 33b and is engaged with the plate attachment section 33b in the rotation direction. Thus, the transmission plate 32 and the output shaft 33 can rotate integrally. A C-ring 51 as a restriction section is fixed to the base end section of the output shaft 33. The C-ring 51 is in contact with the transmission plate 32 in the axial direction and functions as a retainer for preventing the transmission plate 32 from slipping off the base end side of the output shaft 33.

The transmission plate 32 is formed with an intermediate section 32b that extends from an axial end portion of the tubular section 32a and curves toward the outer peripheral side. Nine engagement pieces 32c extending radially outward are formed in the intermediate section 32b at equal circumferential intervals. Each engagement piece 32c is fitted in each engagement groove 43 of the wheel gear 31. Thus, each engagement groove 43 and each engagement piece 32c engage with each other in the rotation direction and the wheel gear 31 and the transmission plate 32 can rotate integrally. That is, the wheel gear 31, the transmission plate 32 and the output shaft 33 constituting the output member 23 rotate integrally and coaxially. An opening of the wheel accommodation recess section 21c, which accommodates the output member 23, is blocked by a cover member 52. The base end section of the output shaft 33 (or the plate attachment section 33b) is supported by a part of the cover member 52.

In the output member 23 having the above-described structure, certain three of the engagement pieces 32c of the transmission plate 32 elastically contact with the protruding sections 46 of the elastic claw sections 45 of the wheel gear 31 in the axial direction. That is, the transmission plate 32 is biased toward the base end side of the output shaft 33, and the tubular section 32a of the transmission plate 32 is pressed against the C-ring 51. Since the elastic claw sections 45 press the transmission plate 32 in this way, the dimension error and the assembly error between the wheel gear 31 and the transmission plate 32 in the axial direction are absorbed. Accordingly, backlash between the wheel gear 31 and the transmission plate.32 in the axial direction is prevented.

Figure 5:
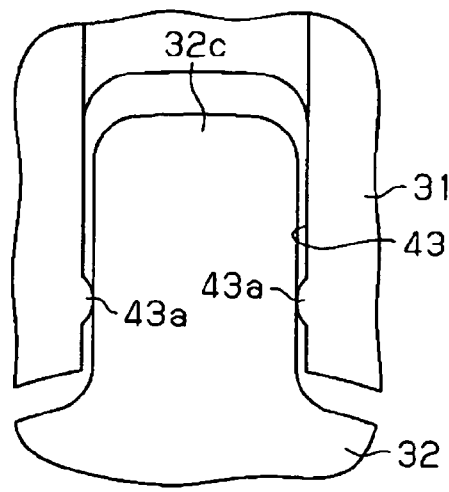
FIG. 5 is a front view showing an engagement groove and an engagement piece according to the FIG. 1 embodiment.

When the above-described output member 23 is assembled, the wheel gear 31 and the output shaft 33 are fitted into the wheel accommodation recess section 21c, and then, the transmission plate 32 is assembled along the axial direction. At that time, each engagement piece 32c of the transmission plate 32 is press-fit into each engagement groove 43 of the wheel gear 31. As shown in FIG. 5, press-fitting protrusions 43a as rotation direction pressing sections are formed on the both side surfaces of each engagement groove 43 facing in the rotation direction. If the engagement piece 32c is pushed into the engagement groove 43, the press-fitting protrusions 43a are flattened out. Thus, the press-fitting protrusions 43a elastically press the engagement piece 32c in the rotation direction. Accordingly, the dimension error and the assembly error between the wheel gear 31 and the transmission plate 32 in the rotation direction are absorbed. Thus, backlash between the wheel gear 31 and the transmission plate 32 in the rotation direction is prevented.

In the above-described motor 1, if the rotary shaft 10 is rotated by the drive of the motor main body 2, the brake mechanism 24 and the worm shaft 22 rotate. The rotation of the worm shaft 22 is transmitted to the wheel gear 31, and the wheel gear 31, the transmission plate 32 and the output shaft 33 rotate integrally. At this time, the backlash between the wheel gear 31 and the transmission plate 32 in the axial direction and the rotation direction is inhibited, and the rotation of the worm shaft 22 is smoothly transmitted to the output shaft 33. Since the worm shaft 22 of the motor 1 according to the present embodiment is constituted by the double enveloping worm that can provide the large meshing number between the worm shaft 22 and the wheel gear 31, breakage of the worm shaft 22 and the wheel gear 31 and the like can be inhibited even if the buffer member such as the rubber is not provided between the wheel gear 31 and the transmission plate 32 in the rotation direction.

The above-described embodiment exerts following characteristic effects.

(1) The present embodiment uses the transmission plate 32 as a transmission member and the C-ring 51 as a restriction section. The transmission plate 32 is attached to the wheel gear 31 in the axial direction of the wheel gear 31 and directly engages with the wheel gear 31 in the rotation direction. The transmission plate 32 transmits the rotation of the wheel gear 31 to the output shaft 33. The C-ring 51 is provided at the position where the C-ring 51 sandwiches the transmission plate 32 with the wheel gear 31 in the axial direction. The C-ring 51 restricts the movement of the transmission plate 32 in the axial direction opposite from the wheel gear 31 side. The elastic claw section 45 as a pressing member is formed on the wheel gear 31. The elastic claw section 45 presses the transmission plate 32 against the C-ring 51 in the axial direction. Thus, the transmission plate 32 is pressed by the elastic claw sections 45 against the C-ring 51 in the axial direction. Accordingly, the dimension error, the assembly error and the like between the wheel gear 31 and the transmission plate 32 in the axial direction are absorbed. Therefore, the backlash between the wheel gear 31 and the transmission plate 32 in the axial direction can be inhibited even if the buffer member is not used. Eventually, the backlash between the wheel gear 31 and the output shaft 33 in the axial direction can be inhibited.

(2) In the present embodiment, the press-fitting protrusion 43*a* (the rotation direction pressing section) is formed in the engagement groove 43 of the wheel gear 31. The press-fitting protrusion 43*a* elastically presses the engagement piece 32*c* of the transmission plate 32 in the rotation direction. Therefore, the dimension error, the assembly error and the like between the wheel gear 31 and the transmission plate 32 in the rotation direction are absorbed, and the backlash between the wheel gear 31 and the transmission plate 32 in the rotation direction can be inhibited.

(3) In the present embodiment, the elastic claw section 45 is formed in the wheel gear 31. The elastic claw section 45 presses the engagement piece 32*c* of the transmission plate 32 in the axial direction. Accordingly, the transmission plate 32 can be pressed against the C-ring 51 in the axial direction with the elastic claw section 45.

The above-described embodiment may be modified and implemented as follows, for example.

In the above-described embodiment, the elastic claw sections 45 are formed in the wheel gear 31, but the present invention is not limited thereto. For example, a construction shown in FIGS. 6A and 6B, in which the elastic claw section 45 is not provided, may be employed. As shown in FIGS. 6A and 6B, both side portions of each engagement groove 61 of the wheel gear 31 facing in the rotation direction are formed as inclined sections 62, each of which is inclined toward the rotation direction. The inclined sections 62 are formed in tapered shapes such that distance therebetween widens toward the opening (i.e., in an upward direction in FIG. 6B). Both end portions of each engagement piece 32*c* of the transmission plate 32 in the rotation direction are in contact with the inclined sections 62 of each engagement groove 61 respectively.

The C-ring 51 as the restriction section is fixed to the base end section of the output shaft 33 (i.e., the plate attachment section 33*b*) in the state where the C-ring 51 presses the transmission plate 32 against the wheel gear 31 side in the axial direction. Each engagement piece 32*c* of the transmission plate 32 is pressed against the inclined sections 62 of each engagement groove 61 of the wheel gear 31 in the axial direction. Thus, thrust applied to the inclined sections 62 in the axial direction is distributed also in the rotation direction. Accordingly, each engagement piece 32*c* applies the thrust to each engagement groove 61 not only in the axial direction but also in the rotation direction.

With such the construction, the C-ring 51 also functions as a pressing member for pressing the transmission plate 32 against the wheel gear 31. Because of the thrust from the C-ring 51, the dimension errors and the assembly errors between the wheel gear 31 and the transmission plate 32 in the axial direction and the rotation direction are absorbed. Accordingly, the backlash between the wheel gear 31 and the transmission plate 32 in the axial direction and the rotation direction is prevented. Moreover, since the C-ring 51 as the restriction section doubles as the pressing member, specific structure as the pressing member is unnecessary, and the structure can be simplified.

The shape of the engagement piece 32*c* of the transmission plate 32 in the structure shown in FIGS. 6A and 6B may be changed into a shape shown in FIG. 7A or 7B, for example. The engagement piece 32*c* shown in FIG. 7A has elastic sections 32*d* (rotation direction pressing sections) extending toward the wheel gear 31 respectively from both ends of the engagement piece 32*c* in the rotation direction. Each elastic section 32*d* elastically contacts each inclined section 62 of the engagement groove 61. The engagement piece 32*c* shown in FIG. 7B is formed with elastic sections 32*e* (rotation direction pressing sections) extending in a direction opposite from the wheel gear 31 respectively from both ends of the engagement piece 32*c* in the rotation direction. The cross-section of the engagement piece 32*c* is substantially U-shaped. Each of the elastic sections 32*d* (or 32*e*) elastically contacts with each inclined section 62 of the engagement groove 61. With such the construction, each of the elastic sections 32*d* (or 32*e*) elastically contacts each inclined section 62. Therefore, the backlash prevention effect can be exerted stably.

In the above-described embodiment, the press-fitting protrusion 43*a* is formed as the rotation direction pressing section, but the present invention is not limited thereto. Alternatively, for example, an elastic section 63 as a rotation direction pressing section may be formed as shown in FIGS. 8A to 11B.

Figure 8A:
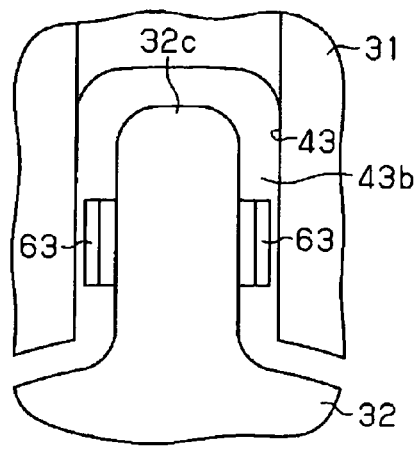
FIG. 8A is a front view showing an elastic section according to another modified embodiment of the present invention.
Figure 8B:
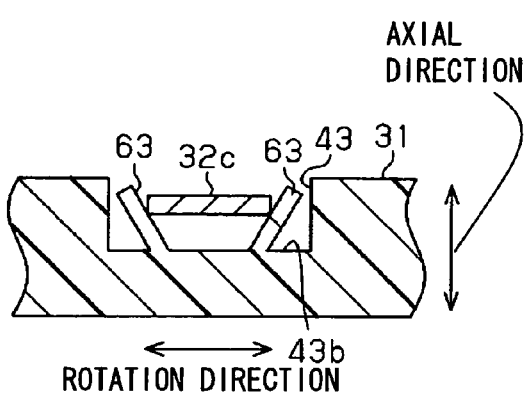
FIG. 8B is a cross-sectional view showing the elastic section according to the FIG. 8A embodiment.

A pair of elastic sections 63 facing each other in the rotation direction are formed to protrude from a bottom section 43*b* of the engagement groove 43 in the structure shown in FIGS. 8A and 8B. The engagement piece 32*c* of the transmission plate 32 is fitted between the elastic sections 63. Thus, the engagement piece 32*c* is elastically held between the elastic sections 63.

Figure 9A:
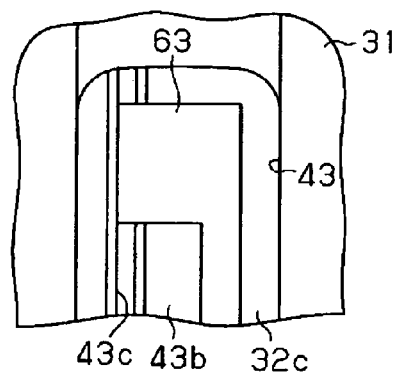
FIG. 9A is a front view showing an elastic section according to another modified embodiment of the present invention.
Figure 9B:
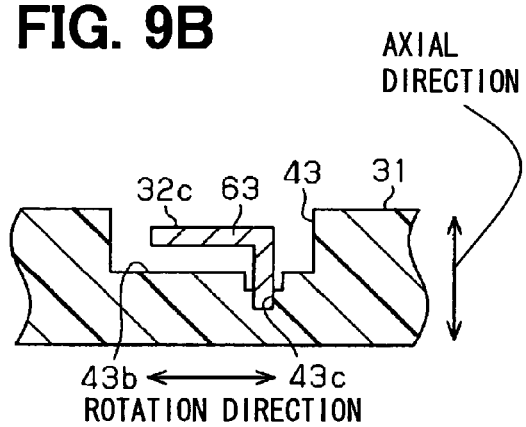
FIG. 9B is a cross-sectional view showing the elastic section according to the FIG. 9A embodiment.

In the structure shown in FIGS. 9A and 9B, an elastic section 63 is formed at the tip of the engagement piece 32*c* of the transmission plate 32 such that the elastic section 63 extends from the tip of the engagement piece 32c in the rotation direction and bends toward the wheel gear 31 side. The elastic section 63 is fixed to a fixation section 43c formed in the shape of a groove in the bottom section 43b of the engagement groove 43.

With the structure shown in FIGS. 8A and 8B or FIGS. 9A and 9B, the dimension errors and the assembly errors between the wheel gear 31 and the transmission plate 32 in the axial direction and the rotation direction are absorbed. Accordingly, the backlash between the wheel gear 31 and the transmission plate 32 in the axial direction and the rotation direction is prevented. Moreover, since the elastic section 63 elastically contacts the engagement piece 32c, the backlash prevention effect can be exerted stably.

Figure 10:
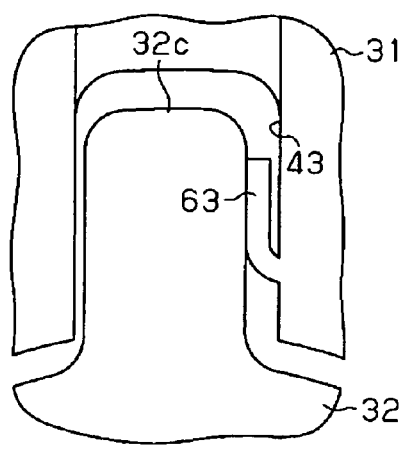
FIG. 10 is a front view showing an elastic section according to another modified embodiment of the present invention.

In the structure shown in FIG. 10, an elastic section 63 is formed on one side surface of the engagement groove 43 facing in the rotation direction such that the elastic section 63 extends from the side surface of the engagement groove 43. The elastic section 63 elastically contacts the engagement piece 32c in the rotation direction. In the structure shown in FIG. 11A, the engagement groove 43 is formed to be narrowed toward the outer peripheral side. Elastic sections 63 are formed at the tip of the engagement piece 32c such that the elastic sections 63 extend from the tip of the engagement piece 32c and are inclined to both sides in the rotation direction. The elastic sections 63 elastically press the engagement groove 43 in the rotation direction. In the structure shown in FIG. 11B, an elastic section 63 is formed such that the elastic section 63 extends from the tip of the engagement piece 32c and is inclined to one side in the rotation direction. The elastic section 63 elastically presses the engagement groove 43 in the rotation direction.

Figure 11A:
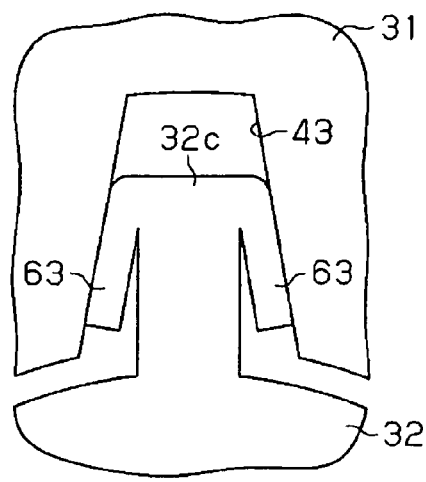
FIGS. 11A and 11B are front views showing elastic sections according to another modified embodiments of the present invention.
Figure 11B:
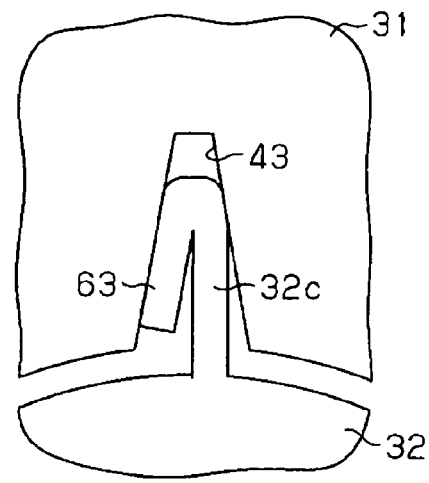

With the structure shown in FIG. 10, 11A or 11B, the dimension error and the assembly error between the wheel gear 31 and the transmission plate 32 in the rotation direction are absorbed. Accordingly, the backlash between the wheel gear 31 and the transmission plate 32 in the rotation direction is prevented. Moreover, since the elastic section 63 elastically contacts the engagement groove 43, the backlash prevention effect can be exerted stably.

Figure 12:
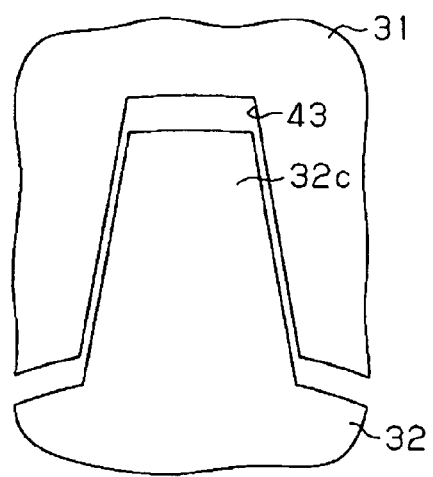
FIG. 12 is a front view showing an engagement groove and an engagement piece according to another modified embodiment of the present invention.

In the above-described embodiments, the both side sections of the engagement piece 32c facing in the rotation direction are provided to be parallel to each other, and so are the both side sections of the engagement groove 43 facing in the rotation direction. Alternatively, for example, the both side sections may be structured such that the distance therebetween narrows toward the outer peripheral side as shown in FIG. 12. With such the structure, the backlash between the wheel gear 31 and the transmission plate 32 in the radial direction and the rotation direction can be inhibited.

In the above-described embodiments, the nine engagement grooves 43 and the nine engagement pieces 32c are provided respectively. However, the present invention is not limited thereto. For example, alternatively, eight or less engagement grooves 43 and eight or less engagement pieces 32c may be provided. Alternatively, ten or more engagement grooves 43 and ten or more engagement pieces 32c may be provided.

In the above-described embodiments, the elastic claw sections 45 are formed on the wheel gear 31 side. Alternatively, the elastic claw sections 45 may be formed on the transmission plate 32 side. Alternatively, instead of the elastic claw sections 45, a rubber member in the shape of a sheet as a separate member may be interposed between the wheel gear 31 and the transmission plate 32 in the axial direction.

In the above-described embodiments, the transmission plate 32 and the output shaft 33 are provided as separate members. Alternatively, the transmission plate 32 and the output shaft 33 may be provided as a single body.

Next, another modification of the above-described embodiment will be described with reference to the drawings.

Figure 13A:
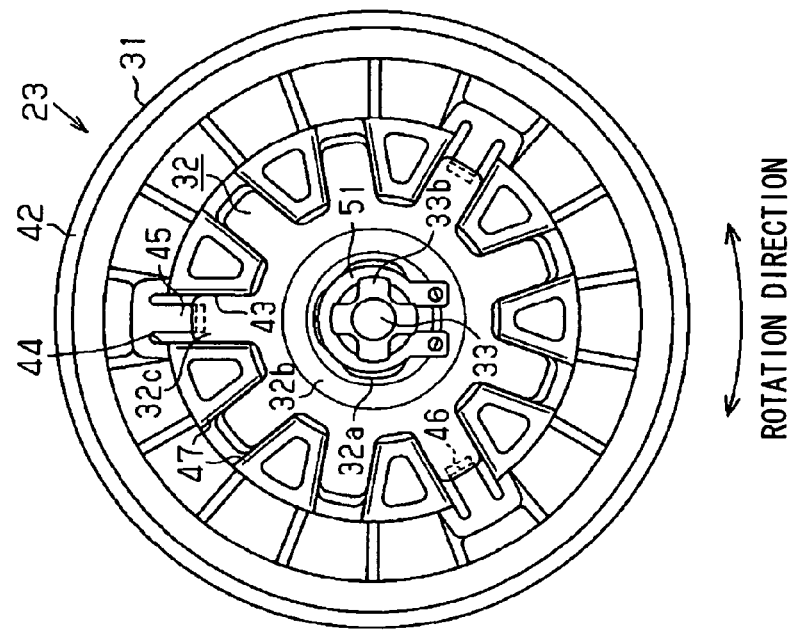
FIG. 13A is a front view showing an output member according to another modified embodiment of the present invention.
Figure 14C:
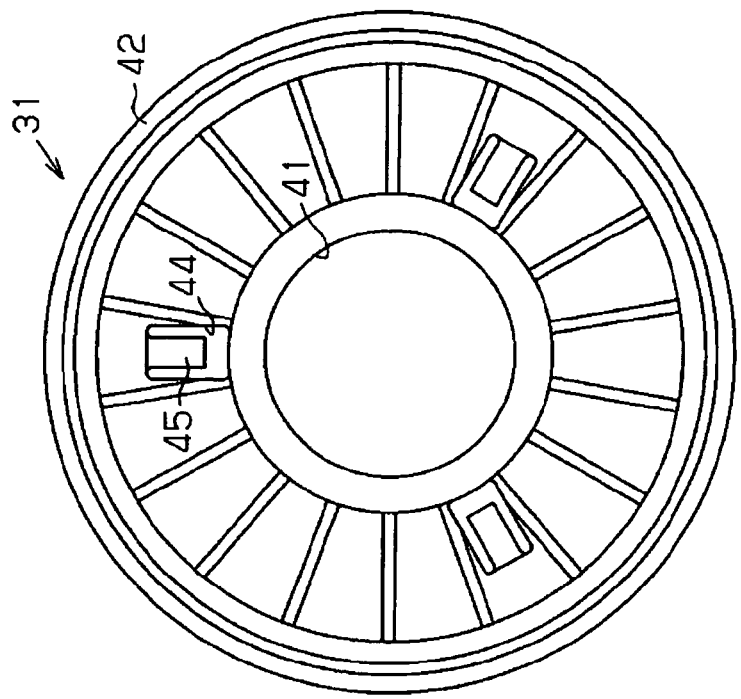
FIG. 14C is a rear view showing the wheel gear according to the FIG. 13A embodiment.
Figure 14B:
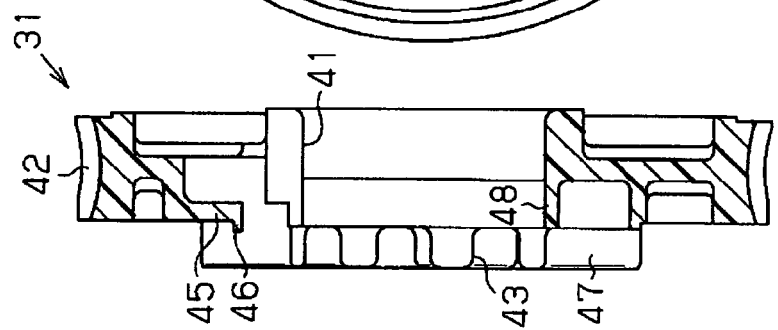
FIG. 14B is a cross-sectional view showing the wheel gear of FIG. 14A taken along the line XIVB-XIVB.
Figure 14A:
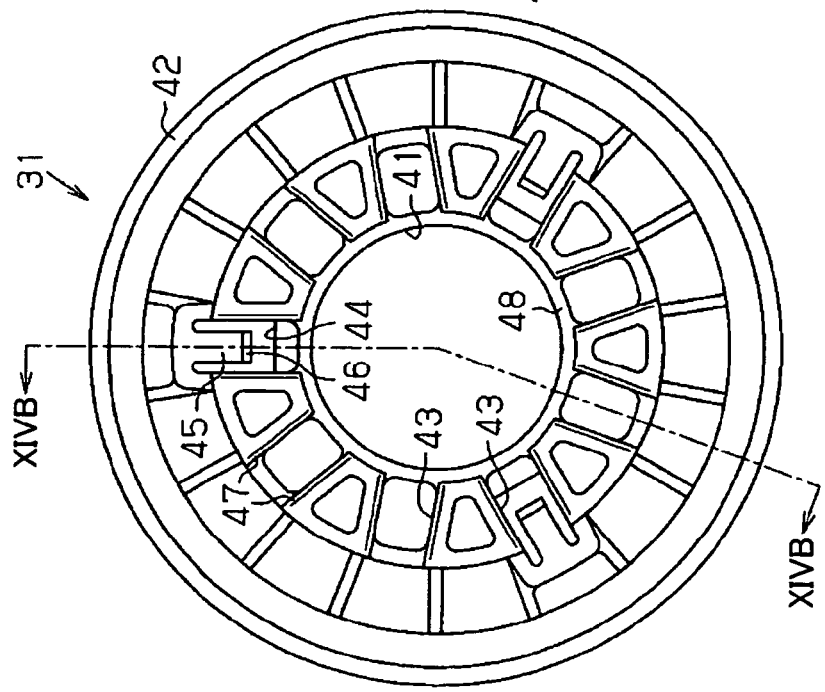
FIG. 14A is a front view showing a wheel gear according to the FIG. 13A embodiment.

A wheel gear 31 according to the present embodiment shown in FIGS. 14A to 14C is made of a resin. As shown in FIGS. 14A to 14C, a gear section 42 to be meshed with a worm 22a of a worm shaft 22 is formed on an outer peripheral portion of the wheel gear 31, and an insertion hole 41 is formed in a central portion of the wheel gear 31. On an axial end face of the wheel gear 31 shown in FIG. 13A, nine engagement grooves 43 extending in radial directions are formed between the insertion hole 41 and the gear section 42 at equal circumferential intervals.

Through holes 44 penetrating through the wheel gear 31 in the axial direction are formed in certain three engagement grooves 43 out of the nine engagement grooves 43, the certain three engagement grooves 43 being positioned at equal circumferential intervals. Each through hole 44 is formed with an elastic claw section 45 extending radially inward from an outer peripheral end portion of the through hole 44. Deflection of the elastic claw section 45 in the axial direction is allowed. A protruding section 46 protruding in the axial direction of the wheel gear 31 is formed on an inner peripheral end portion of each elastic claw section 45.

An inclined section 47 inclined toward the rotation direction is formed on each of both side surfaces of each engagement groove 43 facing in the circumferential direction. The cross-section of each inclined section 47 is formed in an arc shape that curves such that the inclined section 47 is convex toward an outside of the engagement groove 43 along the circumferential direction (refer to FIGS. 14B and 15).

Figure 13B:
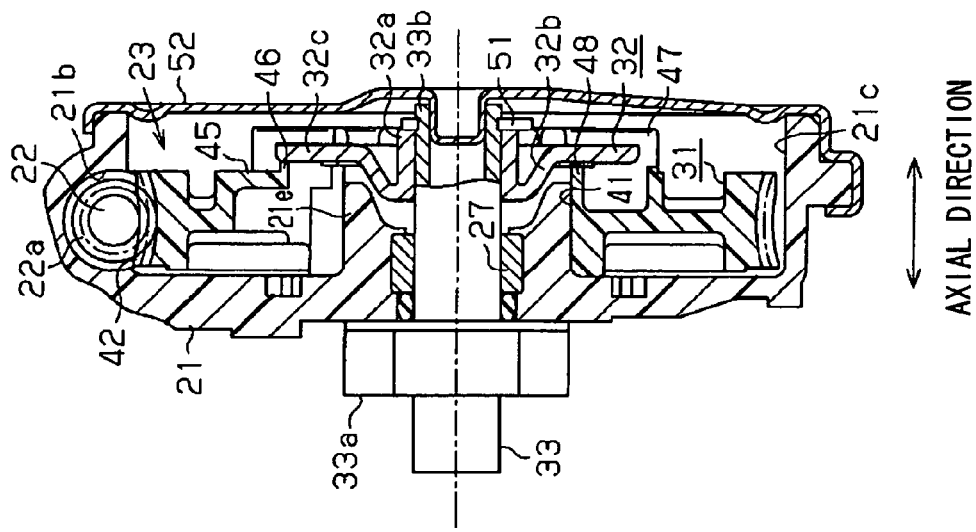
FIG. 13B is a cross-sectional view showing a speed reducing section according to the FIG. 13A embodiment.

As shown in FIG. 13B, a tip of an output shaft 33 rotatably supported by a bushing 27 protrudes to an outside of a gear housing 21. A connection section 33a connected with a window regulator (not shown) for driving the window regulator is formed near the tip of the output shaft 33. The window regulator opens and closes window glass. The connection section 33a is in contact with an outer surface of the gear housing 21 (or a wheel accommodation recess section 21c) in the axial direction. A base end section of the output shaft 33 is located inside the gear housing 21 (or the wheel accommodation recess section 21c). The base end section is formed with a plate attachment section 33b, to which a transmission plate 32 is attached. The transmission plate 32 constitutes an output member 23 together with the output shaft 33 and the wheel gear 31. The plate attachment section 33b is formed in a cross shape when viewed along the axial direction (refer to FIG. 13A).

The transmission plate 32 is made of a metal. As shown in FIGS. 13A and 13B, a tubular base section 32a is formed in a central portion of the transmission plate 32. The plate attachment section 33b of the output shaft 33 is inserted into the tubular base section 32a. The base section 32a is formed in a cross shape corresponding to the shape of the plate attachment section 33b and is engaged with the plate attachment section 33b in the rotation direction. Thus, the transmission plate 32 and the output shaft 33 can rotate integrally. A C-ring 51 as a fixing member is fixed to the base end section of the output shaft 33 in a state where the C-ring 51 presses the transmission plate 32 against the wheel gear 31 side in the axial direction. That is, the C-ring 51 is provided such that the C-ring 51 and the wheel gear 31 sandwich the transmission plate 32 in the axial direction. Thus, axial movement of the base section 32a of the transmission plate 32 is restricted, and the C-ring 51 functions as a retainer for preventing the transmission plate 32 from slipping off the base end side of the output shaft 33.

An intermediate section 32b is formed on the base section 32a of the transmission plate 32. The intermediate section 32b extends from an axial end portion of the base section 32a and curves toward an outer peripheral side. Nine engagement pieces 32c extending radially outward are formed on the intermediate section 32b at equal circumferential intervals. Each engagement piece 32c is loosely fitted in each engagement groove 43 of the wheel gear 31. When a motor main body 2 is in a not-driven state, i.e., when the worm shaft 22 and the wheel gear 31 are in a not-rotating state, the engagement piece 32c is in contact with a contact section 48 formed in a radially inner end portion of the engagement groove 43. The engagement piece 32 is structured to be able to engage with each inclined section 47 of each engagement groove 43 in the rotation direction. Thus, the wheel gear 31 and the transmission plate 32 can rotate integrally. That is, the wheel gear 31, the transmission plate 32 and the output shaft 33 constituting the output member 23 are structured to be able to rotate integrally and coaxially. An opening of the wheel accommodation recess section 21c, which accommodates the output member 23, is blocked by a cover member 52. The base end section of the output shaft 33 (i.e., the plate attachment section 33b) is supported by a part of the cover member 52.

In the output member 23 having the above-described structure, certain three of the engagement pieces 32c of the transmission plate 32 elastically contact with the protruding sections 46 of the elastic claw sections 45 of the wheel gear 31 in the axial direction. That is, the transmission plate 32 is biased toward the base end side of the output shaft 33, and the base section 32a of the transmission plate 32 is pressed against the C-ring 51. Since the elastic claw sections 45 press the transmission plate 32, the dimension error and the assembly error between the wheel gear 31 and the transmission plate 32 in the axial direction are absorbed. Accordingly, the backlash between the wheel gear 31 and the transmission plate 32 in the axial direction is prevented.

In the above-described motor 1, if the rotary shaft 10 is rotated by the drive of the motor main body 2, the wheel gear 31 rotates through a brake mechanism 24 and the worm shaft 22. The rotation of the wheel gear 31 is transmitted to the transmission plate 32 through the engagement pieces 32c, and thus the transmission plate 32 and the output shaft 33 rotate. Thus, the window regulator connected with the output shaft 33 is driven, and opening/closing action of the window glass is realized.

Figure 15:
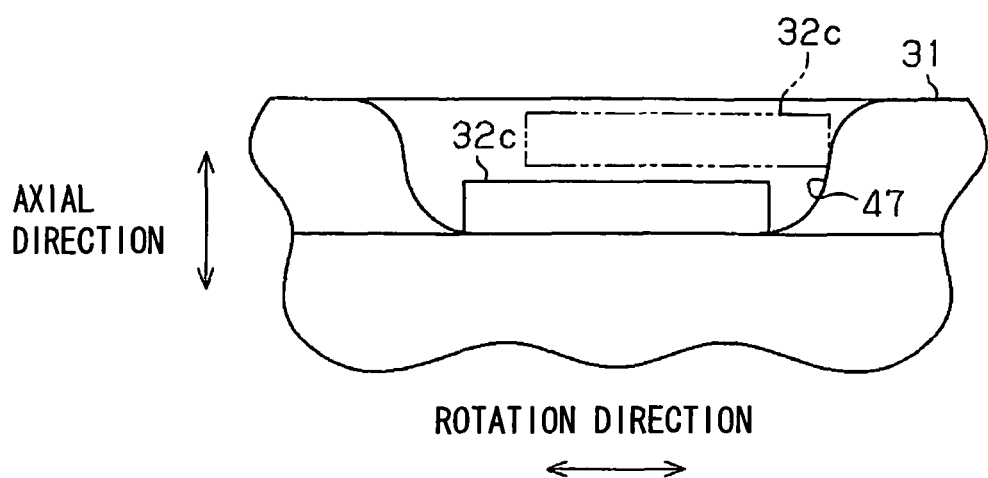
FIG. 15 is a diagram showing an engagement piece according to the FIG. 13A embodiment.

If a load is applied to the rotating output shaft 33, for example, when the window glass changes from an operating state to a fully-opened state or to a fully-closed state, the engagement piece 32c of the transmission plate 32 is guided by the inclined section 47 of the wheel gear 31 and is deformed in the axial direction (as shown by a chain double-dashed line in FIG. 15). The deformation of the engagement piece 32c allows relative rotation between the wheel gear 31 and the transmission plate 32. Thus, a relative rotating force (torque) of the wheel gear 31 with respect to the transmission plate 32 is distributed in the axial direction. Accordingly, a shock generated between the wheel gear 31 and the transmission plate 32 is alleviated. As a result, the impact force between the wheel gear 31 and the transmission plate 32 can be alleviated even if the buffer member is not used.

The motor main body 2 is structured such that the drive of the motor main body 2 is stopped based on detection by a load detection section (not shown) after the occurrence of the deformation of each engagement piece 32c in the axial direction. Each engagement piece 32c is structured such that the engagement piece 32c returns to a normal state (shown by a solid line in FIG. 15), in which the engagement piece 32c contacts the contact section 48 of the wheel gear 31, because of the elastic force of the engagement piece 32c in the axial direction toward the wheel gear 31 side after the drive of the motor main body 2 stops.

The above-described modified embodiment exerts following characteristic effects.

(4) According to the above-described modified embodiment, the transmission plate 32 as the transmission member has the base section 32a attached to the output shaft 33 and the engagement pieces 32c, each of which is formed to protrude from the base section 32a in the radial direction and to be able to deform in the axial direction of the output shaft 33. The transmission plate 32 is attached to the wheel gear 31 through the engagement pieces 32c such that the transmission plate 32 and the wheel gear 31 can rotate integrally. The wheel gear 31 is formed with the inclined sections 47 that engage with the engagement pieces 32c of the transmission plate 32 in the rotation direction and guide the deformation of the engagement pieces 32c in the axial direction. The deformation of the engagement pieces 32c allows the relative rotation between the wheel gear 31 and the transmission plate 32. Therefore, for example, when a load is suddenly applied to the output shaft 33 and rotation of the output shaft 33 is stopped in a state where rotation of the worm shaft 22 is transmitted to the output shaft 33 through the wheel gear 31 and the transmission plate 32 and the output shaft 33 is rotating, the engagement pieces 32c of the transmission plate 32 are guided by the inclined sections 47 of the wheel gear 31 and are deformed in the axial direction. The deformation of the engagement pieces 32c allows the relative rotation between the wheel gear 31 and the transmission plate 32. Thus, the relative rotating force (torque) of the wheel gear 31 with respect to the transmission plate 32 is distributed in the axial direction. That is, the transmission plate 32 functions to absorb the shock generated between the transmission plate 32 and the wheel gear 31. Therefore, the impact force between the wheel gear 31 and the transmission plate 32 can be alleviated even if the buffer member is not used. The engagement pieces 32c are formed such that the engagement pieces 32c can be elastically deformed in the axial direction with respect to the base section 32a due to the guide by the inclined sections 47. Therefore, the shock between the transmission plate 32 and the wheel gear 31 can be suitably distributed in the axial direction by the elastic force of the engagement pieces 32c.

(5) According to the present embodiment, the C-ring 51 as the fixing member restricts the axial movement of the base section 32a of the transmission plate 32. Therefore, the engagement pieces 32c of the transmission plate 32 can be deformed in the axial direction with respect to the base section 32a by the relative rotation between the transmission plate 32 and the wheel gear 31. Moreover, the backlash of the transmission plate 32 in the axial direction can be inhibited by the fixing member.

Figure 16:
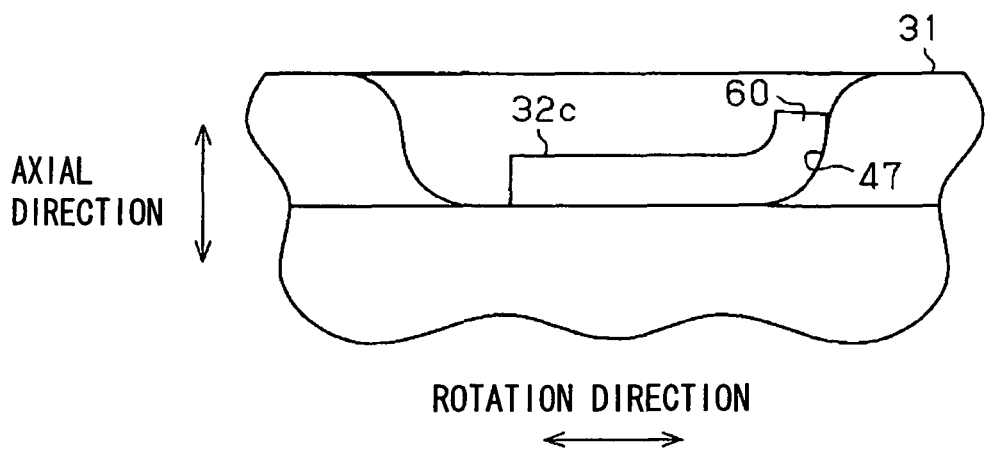
FIG. 16 is a diagram showing an engagement piece and an inclined section according to yet another modified embodiment of the present invention.

The above-described embodiment may be further modified and implemented as follows, for example. In the above-described embodiment, the engagement piece 32c is structured such that the engagement piece 32c deforms over the entire body thereof in the rotation direction due to the guide by the inclined section 47. The present invention is not limited thereto. Alternatively, for example, the engagement piece 32c may be structured such that an end section 60 of the engagement piece 32c in the rotation direction curves and deforms into the axial direction as shown in FIG. 16. Also with such the construction, the shock caused between the transmission plate 32 and the wheel gear 31 in the rotation direction can be distributed into the axial direction. Thus, the impact force can be alleviated even if the buffer member is not used.

In the above-described embodiment, the nine engagement grooves 43 and the nine engagement pieces 32c are provided respectively. The present invention is not limited thereto. For example, alternatively, eight or less engagement grooves 43 and eight or less engagement pieces 32c may be provided. Alternatively, ten or more engagement grooves 43 and ten or more engagement pieces 32c may be provided.

In the above-described embodiment, the inclined section 47 of the wheel gear 31 is formed in the curved shape. The present invention is not limited thereto. Alternatively, for example, the inclined surface may be provided with a flat surface.

In the above-described embodiment, a slipping-off prevention surface perpendicular to the rotation direction may be formed on an axial upper end section of the inclined section 47. With such the construction, the engagement piece 32c can be prevented from slipping off the engagement groove 43 because of the deformation of the engagement piece 32c in the axial direction.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An output power transmission device that transmits rotation of a rotary shaft having a worm section on an outer periphery thereof to an output shaft through a wheel gear meshing with the worm section, the output power transmission device comprising:
    a transmission member made of metal and attached to the wheel gear in an axial direction of the wheel gear such that the transmission member directly engages with the wheel gear in a rotation direction and in the axial direction for transmitting rotation of the wheel gear to the output shaft, the transmission member being attached to the output shaft to be rotatable integrally with the output shaft;
    a restriction section provided at a position where the restriction section sandwiches the transmission member with the wheel gear in the axial direction for restricting movement of the transmission member in a direction opposite from the wheel gear side; and
    a pressing member provided in one of the wheel gear and the transmission member to press the transmission member by an elastic force of the pressing member against either one of the wheel gear and the restriction section in the axial direction, the pressing member having an elastic claw section that is formed in the one of the wheel gear and the transmission member and that presses another one of the wheel gear and the transmission member in the axial direction,
    wherein the transmission member has a structure pressing against the restriction section in the axial direction by an elastic force of the elastic claw section.

2. The output power transmission device as in claim 1, wherein
    one of the wheel gear and the transmission member is provided with a rotation direction pressing section that elastically contacts the other one of the wheel gear and the transmission member in the rotation direction.

3. The output power transmission device as in claim 1, wherein
    the restriction section is provided in a state where the restriction section presses the transmission member against the wheel gear in the axial direction.

4. The output power transmission device as in claim 3, wherein
    the wheel gear is formed with an inclined section inclined toward the rotation direction of the wheel gear, and
    the transmission member is structured such that the transmission member is pressed against the inclined section of the wheel gear in the axial direction by the restriction section.

5. A motor with a speed reducing mechanism, comprising:
    a motor main body having a rotary shaft, wherein
    the motor is structured to be able to output rotation of the rotary shaft of the motor main body through the output power transmission device as in claim 1.

6. The output power transmission device as in claim 1, wherein
    the transmission member has a base section attached to the output shaft and at least one engagement piece formed such that the engagement piece protrudes from the base section in a radial direction and such that at least a part of the engagement piece can deform in an axial direction of the output shaft, and
    the transmission member is attached to the wheel gear through the engagement piece such that the transmission member and the wheel gear can rotate integrally.

7. The output power transmission device as in claim 6, wherein
    the wheel gear is formed with an inclined section that engages with the engagement piece of the transmission member in the rotation direction and that guides the deformation of at least a part of the engagement piece in the axial direction, and
    the deformation of the engagement piece allows relative rotation between the wheel gear and the transmission member.

8. The output power transmission device as in claim 7, wherein
    the engagement piece of the transmission member is structured such that the engagement piece can elastically deform in the axial direction with respect to the base section due to the guide by the inclined section of the wheel gear.

9. The output power transmission device as in claim 7, wherein
    the engagement piece of the transmission member is structured such that an end portion of the engagement piece in the rotation direction can elastically deform in the axial direction due to the guide by the inclined section of the wheel gear.

10. The output power transmission device as in claim 7, wherein
    the restriction section is provided to the output shaft as a fixing member for restricting movement of the base section of the transmission member in the axial direction of the output shaft.

11. A motor with a speed reducing mechanism, comprising:
    a motor main body having a rotary shaft, wherein
    the motor is structured to be able to output rotation of the rotary shaft of the motor main body through the output power transmission device as in claim 7.

12. The output power transmission device as in claim 6, wherein the wheel gear is formed with at least one engagement groove that engages with the engagement piece of the transmission member in the rotation direction.

13. The output power transmission device as in claim 12, wherein the engagement groove and the engagement piece are formed to be narrowed toward an outer peripheral side respectively.

14. The output power transmission device as in claim 12, wherein one of the wheel gear and the transmission member is provided with a rotation direction pressing section that elastically contacts the other one of the wheel gear and the transmission member in the rotation direction.

15. The output power transmission device as in claim 14, wherein the rotation direction pressing section is a protrusion formed on a side surface of the engagement groove facing in the rotation direction or an elastic member that extends from a side surface of the engagement groove facing in the rotation direction and that is bent due to the elastic contact with the engagement piece in the rotation direction.

16. The output power transmission device as in claim 14, wherein the engagement groove has side surfaces that face in the rotation direction and that are inclined toward the axial direction, and both ends of the engagement piece in the rotation direction are bent along the inclined side surfaces of the engagement groove toward an outside or an inside of the engagement groove to provide the rotation direction pressing section.

17. The output power transmission device as in claim 14, wherein the rotation direction pressing section is a pair of elastic protrusions formed on a bottom of the engagement groove, wherein the pair of the elastic protrusions hold the engagement piece therebetween.

18. The output power transmission device as in claim 14, wherein the rotation direction pressing section is an elastic member that extends from a tip of the engagement piece in the rotation direction and that is bent toward the wheel gear side and fixed to a bottom of the engagement groove.

19. The output power transmission device as in claim 14, wherein the engagement groove is formed to be narrowed toward an outer peripheral side, and the rotation direction pressing section is at least one elastic member that extends from a tip of the engagement piece along a side surface of the engagement groove facing in the rotation direction.

\* \* \* \* \*